(12) United States Patent
Tatsuta et al.

(10) Patent No.: US 7,184,702 B2
(45) Date of Patent: Feb. 27, 2007

(54) SIGNAL DISTRIBUTION SYSTEM, TRANSMISSION DEVICE, RECEPTION DEVICE, SIGNAL DISTRIBUTION METHOD, TRANSMISSION METHOD, RECEPTION METHOD, MEDIUM AND INFORMATION ASSEMBLY

(75) Inventors: Akihiro Tatsuta, Kyoto (JP); Shotaro Tanaka, Katano (JP); Koji Arii, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 792 days.

(21) Appl. No.: 09/941,979

(22) Filed: Aug. 29, 2001

(65) Prior Publication Data

US 2002/0072327 A1    Jun. 13, 2002

(30) Foreign Application Priority Data

Sep. 4, 2000    (JP)    ............................. 2000-266693

(51) Int. Cl.
*H04H 1/00*    (2006.01)
(52) U.S. Cl. ........................ 455/3.1; 455/6.1
(58) Field of Classification Search .................... None
See application file for complete search history.

(56) References Cited

U.S. PATENT DOCUMENTS

| | | | |
|---|---|---|---|
| 4,264,925 A * | 4/1981 | Freeman et al. ............ 725/138 |
| 5,953,429 A | 9/1999 | Wakai et al. |
| 6,014,381 A | 1/2000 | Troxel et al. |
| 6,148,175 A * | 11/2000 | Freedland .................. 455/3.06 |
| 2002/0181421 A1* | 12/2002 | Sano et al. ................. 370/335 |
| 2005/0152462 A1 | 7/2005 | Tatsuta et al. |

FOREIGN PATENT DOCUMENTS

| | | | |
|---|---|---|---|
| JP | 8-149453 A | 6/1996 |
| JP | 9-102939 A | 4/1997 |
| JP | 9-307875 A | 11/1997 |
| JP | 2000-209086 A | 7/2000 |

OTHER PUBLICATIONS

Japanese Office Action for JP 2000-266693, dated May 23, 2006.

* cited by examiner

*Primary Examiner*—Creighton Smith
(74) *Attorney, Agent, or Firm*—RatnerPrestia

(57) ABSTRACT

A signal distribution system has
  a transmission means of respectively allocating different frequencies to a plurality of signals and of transmitting the signals by utilizing the allocated frequencies and communication paths for transmitting the plurality of signals to be transmitted and
  a plurality of reception means of receiving signals to which the corresponding frequencies are allocated based on predetermined corresponding relationships from among the transmitted plurality of signals characterized in that
wherein the corresponding relationships are corresponding relationships between each of the frequencies and each of the reception means that have been predetermined based on substantial distances between the transmission means and each of the reception means along the communication paths.

15 Claims, 3 Drawing Sheets

SIGNAL DISTRIBUTION SYSTEM, TRANSMISSION DEVICE, RECEPTION DEVICE, SIGNAL DISTRIBUTION METHOD, TRANSMISSION METHOD, RECEPTION METHOD, MEDIUM AND INFORMATION ASSEMBLY

BACKGROUND OF THE INVENTION

1. Field of the Invention

The present invention relates to a signal distribution system, transmission device, reception device, signal distribution method, transmission method, reception method, medium and information assembly which are, for example, utilized for an entertainment system in an airplane, or the like.

2. Related Art of the Invention

In recent years entertainment services such as viewing movies, listening to music, playing games, in-flight shopping, telephone calls and contacting flight attendants are provided through the terminal installed on the back of the seat or in the armrest part in an airplane and the enhancement of the performance of these services is advancing. In order to implement these services an SEB (seat electric box) that can be controlled by each individual is given to in-flight passengers. In this SEB one from among a plurality of video signals and audio signals sent from a video and audio transmission device installed at the front of the cabin of the airplane can be selected.

This plurality of signals are, respectively, analog modulated or base band modulated and, after that, are frequency multiplexed in one coaxial cable so as to be transmitted to the SEB of each passenger via an ADB (area distribution box). At this time, the boxes are positioned in separate places from each other and, therefore, the total cable length from the transmission device to the SEBs of the passengers sometimes becomes from one hundred to several hundreds of feet.

In such a system, an optimal signal level must be supplied to the SEB of each passenger taking into consideration the transmission loss that occurs in the cable. This is because when the signal level is too low, the video signal becomes degraded and noise (snow) appears on the screen while, contrarily, when the signal level is too high interference is caused in neighboring channels.

Furthermore, since the frequency range transmitted through a coaxial cable is usually in the range of from several tens of MHz to the vicinity 300 MHz, attention must be paid to the loss due to high frequency. This is because the loss at high frequencies is considerably large in comparison with the case where a low frequency is used. In addition, when the total cable length is long a tilt sometimes appears in the frequency characteristics.

Here, the configuration and operation of an in-flight entertainment system according to a prior art are concretely described in reference to FIG. 6. Here, FIG. 6 is a configuration diagram of an in-flight entertainment system according to a prior art.

In FIG. 6 video signals and audio signals inputted from a plurality of input sources are supplied to a PESC (passenger entertainment service controller) 60. The inputted signals are processed in a processing circuit 61 in this PESC 60 and so as to be supplied to a variable gain amplifier 62. This amplifier 62 has an output to a coaxial cable and supplies a signal to an ADB 70.

At the ADB 70 the inputted signal is transferred to another ADB via a line 71 and, at the same time, is sampled in a tap division circuit 72 so as to be supplied to a variable equalizer 73. A signal from this variable equalizer 73 is supplied to a variable gain amplifier 74. The output of the variable gain amplifier 74 is supplied to an SEB 80 via a coaxial cable 75.

The SEB 80 is provided below a passenger seat and includes a tap division circuit 81 wherein this circuit 81 divides the signal and transfers the signal to another SEB on the cable 82 while, on the other hand, samples a signal and gives this signal to the input of a variable gain amplifier 83. In addition, the amplifier 83 supplies the signal to a tuner 84 provided in a passenger seat.

Here, in order to guarantee the RF level wherein the tuner 84 is operated under optimal conditions, the PESC 60, the ADB 70 and the SEB 80 are provided, respectively, with a microprocessor 63, a microprocessor 76 and a microprocessor 85 which monitor the reception level of the tuner and the output level of the variable gain amplifier and control the variable equalizer 73, the variable gain amplifier 62, the variable gain amplifier 74 and the variable gain amplifier 83 so that the reception level of the tuner provided in a passenger seat becomes optimized (an associated technology is, for example, disclosed in Japanese Patent Laid-Open H5(1993)-207321).

In the configuration of such an in-flight entertainment system according to the prior art, however, a plurality of variable gain amplifiers and variable equalizers are controlled by using microprocessors and, therefore, the configuration and processing in the device become complicated and it is difficult to effectively transmit data.

For example, in the control of a variable equalizer, unmodified carrier wave signals of a pair of separate frequencies (usually the highest frequency and the lowest frequency) are utilized in the utilized frequency range so as to carry out an adjustment of the tilt which occurs in a cable based on the reception level difference of a tuner. Accordingly, in the case that there is an abnormality in the unmodified carrier wave signals (for example, a fault or degradation in the unmodified carrier wave generation circuit), a mistaken equalizer characteristic is set and, in order to avoid this, processing tends to become complicated.

In addition, a conventional modulation system utilized in a cable transmission is an analog modulation (for example, vestigial side band modulation, or the like) and is not a digital modulation (for example, quadrature amplitude modulation, or the like). In the case of a digital modulation system even in the case that the reception level of the tuner is low, there is almost no effect given to the video quality by combining error corrections and it is acceptable as long as the reception level is within the range of the reception limit while in the case of analog modulation it is necessary to finely adjust the reception level of a tuner and the configuration of a device tends to be complicated.

In this manner, there is a problem in the in-flight entertainment system according to the prior art that data cannot be effectively transmitted.

SUMMARY OF THE INVENTION

A purpose of the present invention is to provide a signal distribution system, a transmission device, a reception device, a signal distribution method, a transmission method, a reception method, a medium and an information assembly wherein data can be effectively transmitted by taking the above described problem of the prior art into consideration.

The 1st aspect of the present invention is a signal distribution system comprising a transmission means of respectively allocating different frequencies to a plurality of signals and of transmitting said signals by utilizing the allocated frequencies and communication paths for transmitting said plurality of signals to be transmitted and a plurality of reception means of receiving signals to which the corresponding frequencies are allocated based on predetermined corresponding relationships from among said transmitted plurality of signals characterized in that wherein said corresponding relationships are corresponding relationships between each of said frequencies and each of said reception means that have been predetermined based on substantial distances between said transmission means and each of said reception means along said communication paths.

The 2nd aspect of the present invention is a signal distribution system according to 1st aspect, characterized in that said corresponding relationships are relationships wherein the smaller the substantial distance of a reception means is the higher the frequency which corresponds to the reception means and said plurality of reception means respectively have a plurality of terminals and said communication paths are coaxial cables.

The 3rd aspect of the present invention is a signal distribution system according to 2nd aspect, characterized in that contents of said signals are determined based on requests from said terminals and the determined signals are transmitted on said communication paths by using the frequencies corresponding to the reception means with the terminals that have sent said requirements.

The 4th aspect of the present invention is a signal distribution system according to 3rd aspect, characterized in that said signals are quadrature amplitude modulation signals;

said reception means further have region distribution boxes, respectively, which are connected in the order from said transmission means;

said terminals are seat electronics boxes provided in airplanes and said transmission means is a quadrature amplitude modulation unit which can frequency multiplex said plurality of quadrature amplitude modulation signals.

The 5th aspect of the present invention is a signal distribution system according to 4th aspect, characterized in that said quadrature amplitude modulation unit selects a quadrature modulation system having a multi value number for said signal received by a region distribution box, wherein the smaller the substantial distance between said transmission means and said reception means along said communication path is the higher said multi value number is, and transmission of said signal is carried out by utilizing the selected modulation system.

The 6th aspect of the present invention is a transmission device for respectively allocating different frequencies to a plurality of signals and for transmitting said plurality of signals to a plurality of reception means of receiving signals, to which the corresponding frequencies are allocated based on predetermined corresponding relationships, via communication paths by utilizing the allocated frequencies, wherein the transmission device is characterized in that said corresponding relationships are corresponding relationships between each of said frequencies and each of said reception means that have been predetermined based on substantial distances between said transmission device and each of said reception means along said communication paths.

The 7th aspect of the present invention is a reception device for receiving a signal to which the corresponding frequency is allocated based on a predetermined corresponding relationship from among a plurality of signals transmitted, via a communication path, from a transmission means for respectively allocating different frequencies to said plurality of signals and for transmitting said signals by utilizing the allocated frequencies, wherein the reception device is characterized in that said corresponding relationship is a corresponding relationship between said frequency and said reception device that has been predetermined based on the substantial distance between said transmission means and said reception device along said communication path.

The 8th aspect of the present invention is a signal distribution system characterized by comprising:

a transmission means of selecting modulation systems based on predetermined criteria for a plurality of signals and of transmitting said plurality of signals by utilizing the selected modulation systems;

communication paths for transmitting said plurality of signals to be transmitted; and a plurality of reception means of receiving the allocated signals from among said transmitted plurality of signals.

The 9th aspect of the present invention is a signal distribution system according to 8th aspect, characterized in that:

said signals are quadrature amplitude modulation signals;

said reception means further have a plurality of seat electronics boxes provided in airplanes and region distribution boxes, respectively, which are connected in the order from said transmission means;

said transmission means is a quadrature amplitude modulation unit which can frequency multiplex said plurality of quadrature amplitude modulation signals and is connected to the region distribution box of which the order is the lowest; and the selection of modulation systems based on said predetermined criteria is to select a quadrature modulation system having a multi value number for a signal allocated to a reception means, wherein the lower the order of the reception means is the higher the multi value number is.

The 10th aspect of the present invention is a signal distribution method comprising the steps of:

allocating respectively different frequencies to a plurality of signals on a transmission side;

transmitting said plurality of signals to be transmitted by utilizing the allocated frequencies via communication paths; and receiving signals to which the corresponding frequencies are allocated based on predetermined corresponding relationships from among said transmitted plurality of signals on a plurality of reception sides characterized in that wherein said corresponding relationships are corresponding relationships between each of said frequencies and each of said reception sides that have been predetermined based on substantial distances between said transmission side and each of said reception sides along said communication paths.

The 11th aspect of the present invention is a transmission method for respectively allocating different frequencies to a plurality of signals on a transmission side and for transmitting said plurality of signals to a plurality of reception sides of receiving signals, to which the corresponding frequencies are allocated based on predetermined corresponding relationships, via communication paths by utilizing the allocated frequencies, wherein the transmission method is characterized in that said corresponding relationships are corresponding relationships between each of said frequencies and each of said reception sides that have been predetermined based on substantial distances between said transmission side and each of said reception sides along said communication paths.

The 12th aspect of the present invention is a reception method for receiving a signal to which the corresponding frequency is allocated based on a predetermined corresponding relationship from among a plurality of signals transmitted, via a communication path, from a transmission side for respectively allocating different frequencies to said plurality of signals and for transmitting said signals by utilizing the allocated frequencies, wherein the reception method is characterized in that said corresponding relationship is a corresponding relationship between said frequency and a reception side that has been predetermined based on the substantial distance between said transmission side and said reception side along said communication path.

The 13th aspect of the present invention is a signal distribution method characterized by comprising the steps of:

selecting modulation systems based on predetermined criteria for a plurality of signals on a transmission side;

transmitting said plurality of signals by utilizing the selected modulation systems via communication paths for transmitting said plurality of signals to be transmitted; and receiving the allocated signals from among said transmitted plurality of signals on a plurality of reception sides.

The 14th aspect of the present invention is a medium for holding a program or data that allow a computer to carry out the functions of the entirety of, or part of the means of the entirety of, or part of the present invention according to any of 1st to 9th aspects, wherein the medium is characterized by being able to be processed by a computer.

The 15th aspect of the present invention is an information assembly characterized by being a program or data that allow a computer to carry out the functions of the entirety of, or part of the means of the entirety of, or part of the present invention according to any of 1st to 9th aspects.

REFERENCE NUMERALS

| | |
|---|---|
| 10 | QMU |
| 11-1, ..., 11-N | modulation parts |
| 12-1, ..., 12-N | frequency conversion parts |
| 13 | synthesizing part |
| 14 | controller |
| 0C1 | coaxial cable |
| 1 | first ADB |
| 1A | branch part |
| 1B | AGC part |
| 1C1, 1C2 | coaxial cables |
| 2 | second ADB |
| 2C1, 2C2 | coaxial cables |
| 3 | third ADB |
| 3C1, 3C2 | coaxial cables |
| L | Lth ADB |
| LC2 | coaxial cable |
| 1-1A | branch part |
| 1-1B | tuner |
| 1-1C | demodulation part |
| 1-1D | controller |
| 60 | PESC |
| 61 | processing circuit |
| 62 | variable gain amplifier |
| 63 | microprocessor |
| 70 | ADB |
| 71 | coaxial cable |
| 72 | tap division circuit |
| 73 | variable equalizer |
| 74 | variable gain amplifier |
| 75 | coaxial cable |
| 76 | microprocessor |
| 80 | SEB |
| 81 | tap division circuit |
| 82 | cable |
| 83 | variable gain amplifier |
| 84 | tuner |
| 85 | microprocessor |

PREFERRED EMBODIMENTS OF THE INVENTION

In the following, embodiments of the present invention are described in reference to the figures.

The First Embodiment

Figure 1:
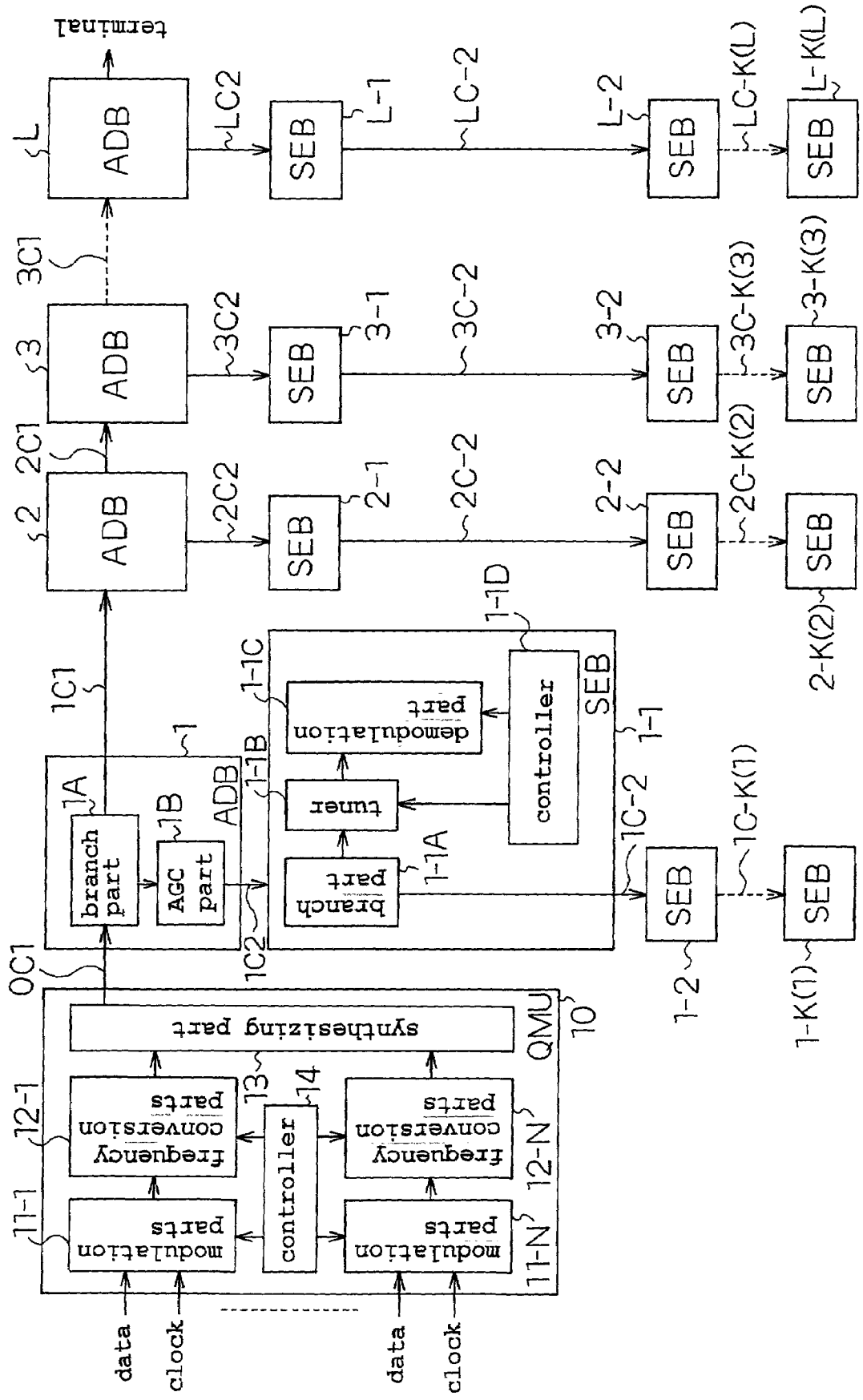
FIG. 1 is a configuration diagram of an in-flight entertainment system according to the first embodiment of the present invention.

FIG. 1 is a configuration diagram of an in-flight entertainment system according to one embodiment using a signal distribution system according to the present invention and, first, the configuration of the in-flight entertainment system according to the first embodiment is described in reference to FIG. 1.

In FIG. 1 a QMU is denoted as 10, N modulation parts are denoted as 11-1 to 11-N, N frequency conversion parts are denoted as 12-1 to 12-N, a synthesizing part is denoted as 13 and a controller is denoted as 14. In addition, a coaxial cable is denoted as 0C1, the first ADB is denoted as 1, a branch part is denoted as 1A, an AGC part is denoted as 1B, coaxial cables are denoted as 1C1 and 1C2, the second ADB is denoted as 2, coaxial cables are denoted as 2C1 and 2C2, the third ADB is denoted as 3, coaxial cables are denoted as 3C1 and 3C2, the Lth ADB is denoted as L, a coaxial cable is denoted as LC2, SEBs forming the first SEB group are denoted as 1-1, 1-2 to 1-K(1), coaxial cables are denoted as 1C-2 to 1C-K(1), SEBs forming the second SEB group are denoted as 2-1, 2-2 to 2-K(2), coaxial cables are denoted as 2C-2 to 2C-K(2), SEBs forming the third SEB group are denoted as 3-1, 3-2 to 3-K(3), coaxial cables are denoted as 3C-2 to 3C-K(3), SEBs forming the Lth SEB group are denoted as L-1, L-2 to L-K(L) and coaxial cables are denoted as LC-2 to LC-K(L). In addition, a branch part is denoted as 1-1A, a tuner is denoted as 1-1B, a demodulation part is denoted as 1-1C and a controller is denoted as 1-1D.

Here, the ADBs from the first ADB 1 to the Lth ADB L are the same and the SEBs from SEB1-1 to SEBL-K(L) are the same. In addition, the figures of the modulation part 11-2, and the like, are omitted.

Figure 2:
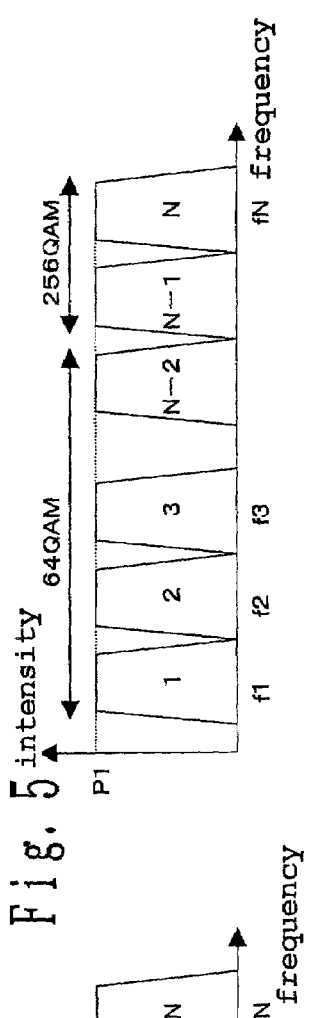
FIG. 2 is an explanatory diagram of a frequency spectrum of signals outputted by QMU 10 according to the first embodiment of the present invention.
Figure 3:
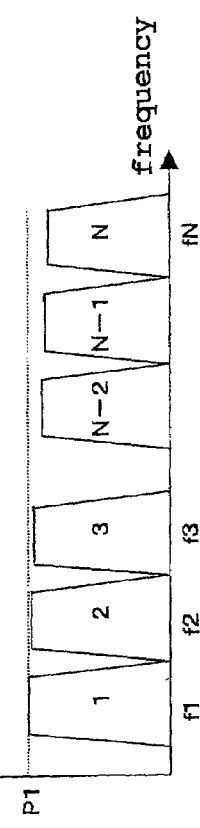
FIG. 3 is an explanatory diagram of a frequency spectrum on the coaxial cable LC2 which is a signal source of the first SEB group according to the first embodiment of the present invention.
Figure 4:
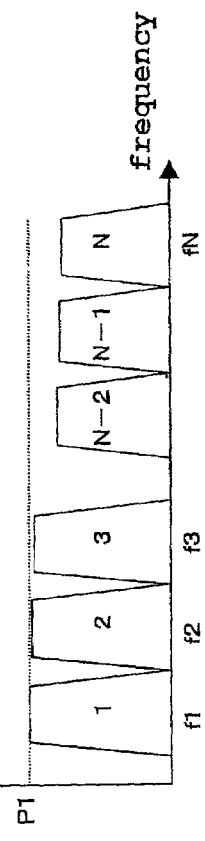
FIG. 4 is an explanatory diagram of a frequency spectrum on the coaxial cable LC2 which is a signal source of the Lth SEB group according to the first embodiment of the present invention.

Next, the operation of the in-flight entertainment system of the embodiment is described in reference to FIGS. 1 to 4, while describing the operation of the in-flight entertainment system of this embodiment, one embodiment of a signal distribution method according to the present invention will also be described. Here, FIG. 2 is an explanatory diagram for a frequency spectrum of a signal outputted by QMU 10, FIG. 3 is an explanatory diagram of a frequency spectrum on the coaxial cable lC2 which is a signal source of the first SEB group and FIG. 4 is an explanatory diagram of a frequency spectrum on the coaxial cable LC2 which is a signal source of the Lth SEB group.

First, the operation of QMU 10 is described.

N pairs of data (a clock is attached to each piece of data) generated in a data generation device (not shown) formed of digital video audio data compressed according to MPEG, WWW data of the Internet, and the like, are, respectively, inputted to the modulation parts 11-1 to 11-N. Here, the bit rate of each piece of data (including redundant data such as parity bits) is 41.34 Mbps.

Here, a signal which has each piece of data is changed in the data content based on requirements (inputted to the above described data generation device (not shown) by the user) from the SEB which receives the signal and is transmitted by using a frequency, as described below, corresponding to the ADB which is connected to the SEB that has provided the requirements.

The modulation part 11-1 to 11-N carry out digital modulation and respectively output QAM signals of which the intermediate frequency is 36.125 MHz. Here, a 64 value QAM modulation is carried out and the occupied bandwidth of the outputted QAM signal becomes approximately 8 MHz.

The QAM signals outputted by the modulation parts 11-1 to 11-N are, respectively, inputted to the frequency conversion parts 12-1 to 12-N and are converted to RF frequencies which have secured intervals of 8 MHz, or more, so as not to overlap. Here, in the frequency range from 100 MHz to 300 MHz, the QAM signals of N waves are arranged so as not to overlap. Here, the frequency arrangement of the QAM signals is controlled by the controller 14 and the frequencies are allocated from the first SEB group to the Lth SEB group in the order from highest to lowest and such a frequency arrangement is described in the following.

All of the signals outputted by the frequency conversion parts 12-1 to 12-N are inputted to the synthesizing part 13 and the synthesizing part 13 frequency multiplexes QAM signals of N waves and outputs them onto the coaxial cable 0C1. Here, the frequency spectrum of the signal outputted by the QMU 10 (synthesizing part 13 in further detail) is shown in FIG. 2 and the number of QAM signals is the N of N waves. In addition, the frequency arrangements of the QAM signals are f1, f2 to fN of which the intensities are all P1.

Next, the operation of the first ADB 1 is described.

The signal of the coaxial cable 0C1 is inputted to the first ADB 1. Here, the first ADB 1 has a branch part 1A and an AGC part 1B.

The branch part 1A taps a signal of the coaxial cable 0C1 and outputs a signal to the second ADB 2 in the next stage via the coaxial cable 1C1 and, at the same time, outputs the same signal to the AGC part 1B.

Then the AGC part 1B automatically adjusts the signal inputted from the branch part 1A at a constant level and outputs this signal to the coaxial cable 1C2.

Next, the operations of SEBs 1-1, 1-2 to 1-K(1) forming the first SEB group connected to the first ADB 1 are described.

First, a signal is inputted from the first ADB 1 to the SEB 1-1 via the coaxial cable LC2. Here, the SEB 1-1 has the branch part 1-1A, the tuner 1-1B, the demodulation part 1-1C and a controller 1-1D.

The branch part 1-1A taps a signal of the coaxial cable 1C2 and outputs a signal to the SEB 1-2 in the next stage via the coaxial cable 1C-2 and also outputs the same signal to the tuner 1-1B.

The tuner 1-1B selects one of the QAM signals of N waves and converts the RF frequency of the selected QAM signal into the intermediate frequency 36.125 MHz. The output signal of the tuner 1-1B is inputted to the demodulation part 1-1C and the demodulation part 1-1C reproduces data from the inputted QAM signal. Here, the controller 1-1D controls the frequency received by the tuner 1-1B and the demodulation part 1-1C.

In the same manner as in the following, one wave is selected from the QAM signals of N waves, respectively, in the SEB 1-2 to the SEB 1-K(1) and data can be respectively reproduced. The operations of the SEBs 2-1, 2-2 . . . , 2-K(2) forming the second SEB group which is connected to the second ADB 2 and the operations of the SEBs L-1, L-2, . . . , L-K(L) forming the Lth SEB group which is connected to the Lth ADB L are, of course, the same operations of the SEBs 1-1, 1-2, . . . , 1-K(1) forming the first SEB group and, therefore, detailed descriptions are omitted.

Here, FIG. 3 shows a frequency spectrum on the coaxial cable 1C2 which is a signal source of the first SEB group and the level of the QAM signals of high frequency is lowered in comparison with a frequency spectrum (see FIG. 2) of the QMU 10 due to the frequency characteristics of the coaxial cable 0C1. In addition, FIG. 4 shows a frequency spectrum on the coaxial cable LC2 which is a signal source of the Lth SEB group and the level of the QAM signals of high frequency is further reduced due to the frequency characteristics of the total of the coaxial cables 0C1, 1C1 to (L−1)C1.

Then, as described above, by allocating the frequencies of the received QAM signals to the SEB groups from the first to the Lth in the order of from highest to lowest, higher frequencies are made to correspond to an ADB with shorter substantial distances from the QMU 10 so that negative effects due to the reduction of the signal level in the high frequencies, which occur in the case that the entire length of the cable leading to the ADB is long, are reduced.

That is to say, the QAM signals of I waves (I is an integer) counting from the QAM signal of the highest frequency fN (see FIG. 3) to the lower frequency side are allocated to the first SEB group. Here, such an I is set so as to be the total bit rate of the first SEB group, or more. Here, there are 32 SEB s in the first SEB group and the bit rate of each SEB is 1.5 Mbps (redundant bits such as parity bits are not included) and the total bit rate becomes 32×1.5=48 Mbps and, therefore, I=2 (accordingly, the bit rate of the QAM signal is 41.34 Mbps×2=82.68 Mbps) works.

In addition, the Lth SEB group is allocated so as to receive QAM signals (that is to say, QAM signals of the frequencies f1 and f2) of two waves counting from the QAM signal of the lowest frequency f1 (see FIG. 4) to the higher frequency side.

At present, since the maximum number of seats of an airplane is approximately 600, the bit rate to each seat assumed to be 1.5 Mbps, the bit rate for the entirety of the seats becomes 600×1.5 Mbps=900 Mbps and 22, or more, becomes necessary as the total number (that is to say N) of QAM signals (because 900 Mbps/41.34 Mbps=21.7).

In this manner, when QAM signals of lower frequency are sequentially received from the SEB groups connected to the ADB located further away from the QMU 10, it becomes possible to reduce the influence of the lowering of the signal level at a high frequency occurring in the case that the entire cable length to the ADB is long.

In addition, by sequentially allocating the frequencies of the received QAM signals, starting from the highest, to the SEB groups starting from the SEB group connected to the AGC output system of the first ADB to the SEB group connected to the AGC output system of the Lth ADB, it becomes possible to reduce the influence of the tilt (that is to say, the phenomenon wherein the signal level is lowered at a high frequency) of the frequency characteristics occurring in the cable connected to the ADB.

The Second Embodiment

Figure 5:
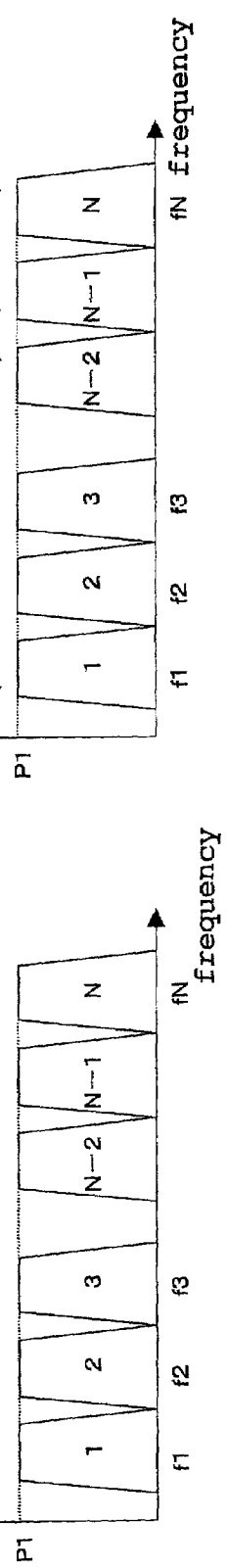
FIG. 5 is an explanatory diagram of signals outputted by QMU 10 according to the second embodiment of the present invention.
Figure 6:
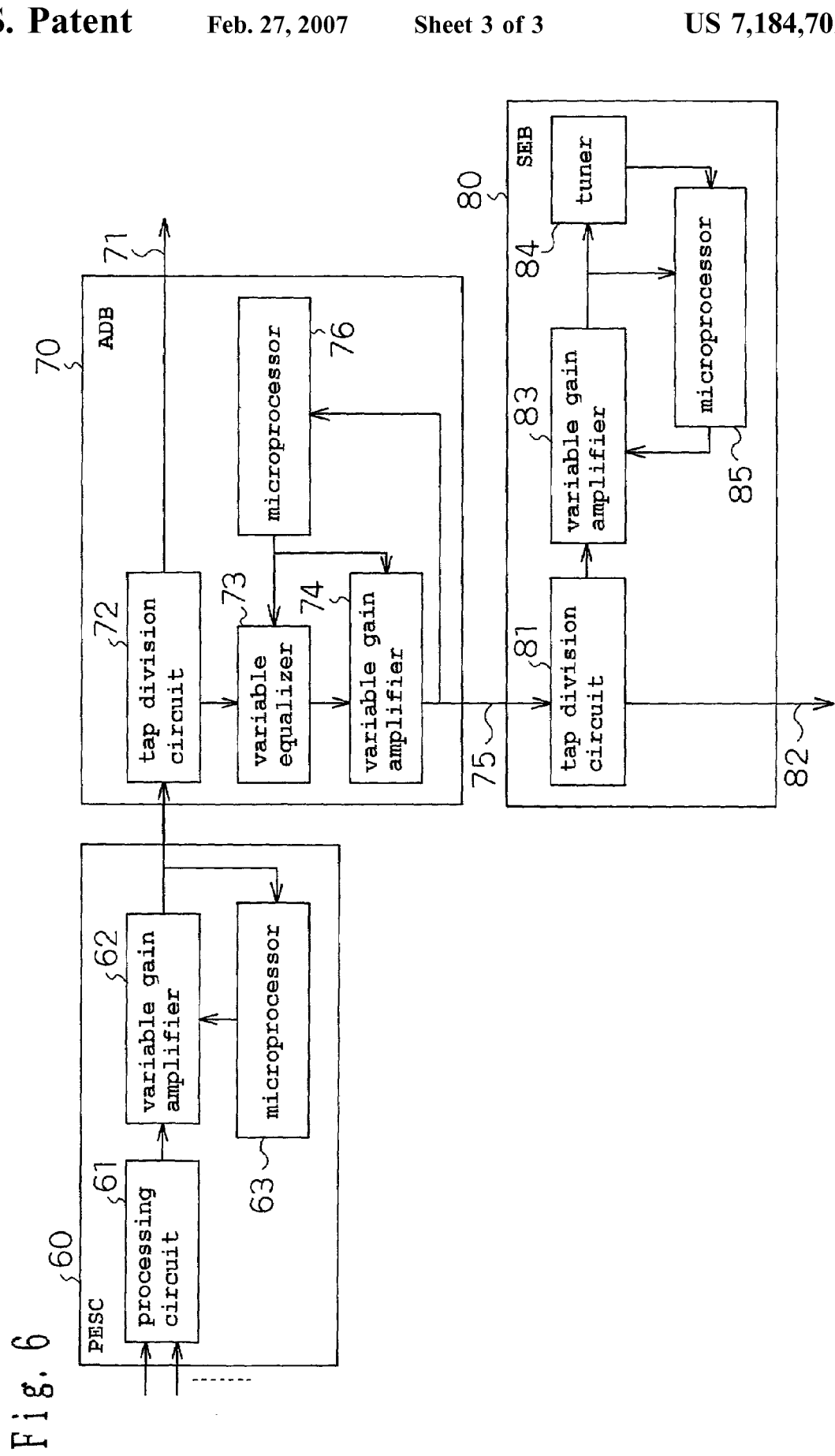
FIG. 6 is a configuration diagram of an in-flight entertainment system according to a prior art.

Next, in reference to FIG. 5, the configuration and the operation of an in-flight entertainment system of the second embodiment, which is one using a signal distribution system of the present invention, are described. Here, FIG. 5 is a explanatory view of a signal outputted by the QMU 10 of the second embodiment.

Though the in-flight entertainment system according to the second embodiment has a configuration similar to the in-flight entertainment system according to the above described first embodiment, it is different from the in-flight entertainment system of the first embodiment in the point that some of the QAM signals of N waves have large multi-value numbers of a quadrature amplitude modulation system. Then, in the following, a method of setting multi-value numbers of the quadrature amplitude modulation system outputted by the QMU 10 (see FIG. 1) of the second embodiment is described in detail. Here, the QAM signals of the second embodiment are N waves of which the frequency arrangement is similar to the frequency arrangement (see FIG. 2) of the QAM signals in the first embodiment as shown in FIG. 5.

First, the multi-value number of the quadrature amplitude modulation system received by the first SEB group which is connected to the first ADB closest to the QMU 10 is selected to be increased. That is to say, since the first SEB group receives two 64 QAM signals of the frequencies fN and f(N-1) in the second embodiment, the controller 14 changes multi-value numbers of the modulation parts 11-N and 11-(N-1) from 64 values to 256 values. Here, as described above, since the bit rate at the time of 64 QAM modulation of the data inputted to the modulation parts is 41.34 Mbps, the bit rate at the time of 256 QAM modulation increases to 41.34×8/6=55.12 Mbps (amount of information transmitted per one symbol is 6 bits at the time of 64 QAM modulation and 8 bits at the time of 256 QAM modulation).

The controller (not shown) inside of the SEB 1-K(1) sets the SEB 1-K(1) (see FIG. 1) at the last edge within the first SEB group so that it can receive a 256 QAM signal and monitors the degree of data error.

The controller inside of the SEB 1-K(1) makes the determination to operate the modulation parts 11-N (see FIG. 1) and 11-(N-1) (not shown) according to the 256 QAM modulation when it recognizes the degree of data error is small (here error ratio is $1.0^{-8}$, or less) and, at the same time, sets all of the SEBs that form the first SEB group connected to the first ADB (see FIG. 1) so that they can receive 256 QAM signals.

Next, multi-value number of the quadrature amplitude modulation system received by the second SEB group that is connected to the second ADB (see FIG. 1) second closest from the QMU 10 is selected to be increased. That is to say, since the second SEB group receives two 64 QAM signals of the frequencies f(N-2) and f(N-3), the controller 14 changes the multi-value numbers of the modulation parts 11-(N-2) and N-(N-3) (not shown) from 64 values to 256 values.

The controller (not shown) inside of the SEB 1-K(2) sets the SEB 2-K(2) at the last edge within the second SEB group so that it can receive a 256 QAM signal and monitors the degree of data error.

The controller inside of the SEB 2-K(2) operates the modulation parts 11-(N-2) and 11-(N-3) again according to the 64 QAM modulation when it recognizes the degree of data error is large (here error ratio is $1.0^{-8}$, or more) and, at the same time, resets the SEB 2-K(2) at the last end connected to the second ADB so that it can receive a 64 QAM signal.

In this manner, concerning the two waves within the QAM signals of N waves, the 256 QAM modulation where the multi-value numbers of the quadrature amplitude modulation system are made to be large is adopted (as shown in FIG. 5 the QAM signals of the frequencies fN and f(N-1) within the QAM signals of N waves are 256 QAM modulation waves and the others are 64 QAM modulation waves).

In this manner, by greatly changing the multi-value numbers of the quadrature amplitude modulation system, a large amount of data can be simultaneously transmitted more effectively in the case that a digital modulation is adopted for the cable transmission in an airplane.

Here, though in the second embodiemnt the digital modulation system is made to utilize quadrature amplitude modulation, it may utilize other digital modulations such as multi-value phase modulation or multi-value vestigial side band modulation. In addition, though the multi-value numbers of the quadrature amplitude modulation are made to be 64 values or 256 values, they are not particularly limited to these values. In addition, though the bit rate of the data inputted from the first to the Nth modulation parts is made to be 41.34 Mbps, it is not particularly limited to this value.

In addition, though in the above embodiments the intermediate frequency of the QAM signal outputted from the modulation parts from the first to the Nth is made to be 36.125 MHz, it is not particularly limited to this value. In addition, though the middle frequency of the QAM signals outputted by the tuner is 36.125 MHz, it is not particularly limited to this value. In addition, though the bit rate to each seat is made to be 1.5 Mbps, it is not particularly limited to this value.

In addition, though in the above embodiments the standard for making the multi-value numbers of the quadrature amplitude modulation large is made to be $1.0^{-8}$, or less, in the error ratio, it is not particularly limited to this condition.

As is clear from the above description, for example, the signal distribution system according to the present invention is characterized by comprising a quadrature amplitude modulation unit (QMU) for generating QAM signals of N waves (N is an integer), respectively from N pairs of data and clock and frequency multiplexes these signals, an ADB for receiving signals outputted by said QMU, which in one case outputs after tapping and in the other case outputs after the automatic gain control (AGC), an SEB for receiving the AGC output of said first ADB which in one case outputs after tapping and in the other case selects a band with a tuner and demodulates the data, a second SEB for receiving the tap output of said first SEB, a third SEB for receiving the tap output of said second SEB, a group consisting of the total of K(1) SEBs connected to the AGC output system of said first ADB, a second ADB for receiving the tap output of said first ADB, a group consisting of the total of K(2) SEBs connected to the AGC output system of said second ADB, a third ADB for receiving the tap output of said second ADB, a group consisting of the total of K(3) SEBs connected to the AGC output system of said third ADB, wherein L (L is an integer) ADBs are connected to the tap system of said first ADB and the total of K=K(1)+K(2)+K(3)+. . . +K(L) SEBs are connected to the AGC output system of each ADB and the SEB groups starting from the SEB group connected to the AGC output system of said first ADB to the SEB group connected to the AGC output group of said Lth ADB are allocated to the received QAM signals in the order starting from the highest frequency of received QAM signal.

Here, though the signal of the present invention is a quadrature amplitude modulation signal according to a digital modulation system in the above embodiments, the signal is not limited to this and, for example, (1) may be a signal according to a digital modulation system such as multi-value phase modulation, multi-value vestigial side band modulation or (2) may be a signal according to an analog modulation system. Here, in the case that according to an analog modulation system, or the like, the amount of information cannot be reduced by compression and, therefore, sufficient information transmission paths must be secured by utilizing a plurality of coaxial cables as a communication path of the present invention in the case that the amount of information to be transmitted becomes large.

In addition, the signal of the present invention changes the contents thereof based on a request from the terminal of the present invention which receives this signal in the above embodiments and is transmitted onto a communication path by using the frequency which corresponds to the reception means that has the terminal which has made the request. However, the signal of the present invention is not limited to this but, rather, may be a signal for broadcasting content which, for example, has been determined uniformly in advance according to a set schedule.

In addition, though in the above embodiments, the corresponding relationships between each of the frequencies and each of the reception means in the present invention are relationships where the higher the frequency is, the smaller is the substantial distance from the transmission means to the reception means which corresponds to the frequency, the relationships are not limited to this but, rather, may be corresponding relationships between each of the frequencies and each of the reception means that have been determined in advance based on the substantial distances between the transmission means and each of the reception means along the communication path.

In addition, though the terminals of the present invention are seat electronic boxes contained in the reception means of the present invention in the above embodiments, they are not limited to this but, rather, may be, for example, audio/video reception devices provided for predetermined compartments.

In addition, though the reception means of the present invention have, respectively, region distribution boxes so as to be connected in order from the transmission means in the above embodiments, they are not limited to this but, rather, may be means of receiving signals to which the corresponding frequencies are allocated from among a plurality of signals transmitted through the communication path of the present invention based on a predetermined corresponding relationship.

In addition, though the communication path of the present invention is a coaxial cable in the above embodiments, it is not limited to this but, rather, may be, for example, an optical fiber, a hybrid transmission path wherein a coaxial cable and an optical fiber are mixed, or the like. Here, in the case that the signal of the present invention is a wireless signal utilizing a wireless radio wave, the communication path of the present invention is a medium such as air.

In addition, the transmission means of the present invention is a quadrature amplitude modulation unit which can frequency multiplex a plurality of quadrature amplitude modulation signals in the above embodiments, it is not limited to this but, rather, may be a means of allocating different frequencies to a plurality of signals, respectively, and for transmitting signals by utilizing the allocated frequencies.

In addition, the selection of a modulation system in the present invention is the selection of a quadrature modulation system for a signal received by a region distribution box wherein the higher the multi-value number held by the quadrature modulation system is, the smaller the substantial distance of the communication path between the transmission means and each of the reception means of the region distribution box is. However, the selection of a modulation system in the present invention is not limited to this but, rather, may be a selection of a modulation system for a plurality of signals based on a predetermined standard. Here, the signal distribution system of the present invention additionally carries out the selection of a modulation system by taking the corresponding relationships between the frequencies and the reception means into consideration in the above embodiments. However, the signal distribution system of the present invention is not limited to this but, rather, may carry out only the selection of a modulation system without taking the relationships between the frequencies and the reception means into consideration. Even so, a large amount of data can, for example, be simultaneously transmitted in an efficient manner.

In addition, though the signal distribution system of the present invention is described in the above embodiments, an example of the transmission device of the present invention is described in a simple manner. For example, such a transmission device comprises a modulation part for digital modulation of the inputted N pieces of data, respectively, into QAM signals of N waves, a frequency conversion part for converting the QAM signals of N waves into RF frequencies of which the intervals are secured, a controller for controlling the frequency arrangement of the QAM signals of N waves, and a synthesizing part for frequency multiplexing the QAM signals of N waves, and hence has a configuration similar to the QMU 10 in the above described embodiments. That is to say, the transmission device of the present invention allocates different frequencies to a plurality of signals, respectively, and utilizes the allocated frequencies and, thereby, transmits a plurality of signals to a plurality of reception means which receive the signals to which the corresponding frequencies are allocated based on a predetermined corresponding relationship via a communication path and this transmission device is characterized in that the corresponding relationship is a corresponding relationship between each of the frequencies and each of the reception means that is predetermined based on the substantial distances of the communication path between the transmission device and each of the reception means.

In addition, though the signal distribution system of the present invention is described in the above embodiments, an example of a reception device of the present invention is described in a simple manner. For example, such a reception device comprises a branch part which can tap a signal of a coaxial cable and can output a signal in the next stage, an AGC part for automatically adjusting the signal inputted from the branch part at a constant level and for outputting the signal, and an SEB group formed of a plurality of SEBs into which a signal is inputted from the AGC part, and hence has a configuration similar to a means including, for example, the first ADB 1 and the first SEB group in the above embodiments. That is to say, the reception device of the present invention receives a signal to which the corresponding frequency is allocated based on a predetermined corresponding relationship from among a plurality of signals transmitted, via a communication path, from a transmission means for respectively allocating different frequencies to said plurality of signals and for transmitting said signals by utilizing the allocated frequencies, and the reception device is characterized in that the corresponding relationship is a corresponding relationship between each frequency and the reception device that is predetermined based on the substantial distance of the communication path between the transmission means and the reception device.

In addition, the present invention is a medium which holds a program and/or data for allowing a computer to carry out the entirety, or a part of, the function of the entirety, or a part of, the means of the above described invention and a medium wherein said program and/or data, which are readable by a computer and which have already been read by a computer, carry out said function in cooperation with said computer.

In addition, the present invention is a medium which holds a program and/or data for allowing a computer to carry out the entirety, or a part of, the operation of the entirety, or a part of, the steps of the above described invention and a medium wherein said program and/or data, which are readable by a computer and which have already been read by a computer, carry out said function in cooperation with said computer.

In addition, the present invention is an information assembly which holds a program and/or data for allowing a computer to carry out the entirety, or a part of, the function of the entirety, or a part of, the means of the above described invention and an information assembly wherein said program and/or data, which are readable by a computer and which have already been read by a computer, carry out said function in cooperation with said computer.

In addition, the present invention is an information assembly which holds a program and/or data for allowing a computer to carry out the entirety, or a part of, the operation of the entirety, or apart of, the steps of the above described invention and information assembly wherein said program and/or data, which are readable by a computer and which have already been read by a computer, carry out said function in cooperation with said computer.

Data include data structure, data format and types of data. A medium includes a recording medium such as a ROM, a transmission medium such as the Internet and a transmission medium such as light, radio waves and sound waves. A medium for holding a program and/or data includes, for example, a recording medium on which a program and/or data are recorded or a transmission medium for transmitting a program and/or data. Allowing a computer to execute includes the case wherein a program and/or data are readable by a computer in the case of, for example, a recording medium such as a ROM and the case wherein a program and/or data, which are transmission objects, are handleable by a computer as a result of transmission. An information assembly includes, for example, software such as a program and/or data.

Here, as described above, the configuration of the present invention may be implemented in a software manner or may be implemented in a hardware manner.

As is clear from the above description, the present invention comprises a QMU for generating QAM signals of N waves respectively, from N pairs of data and clock and frequency multiplexes these signals, an ADB for receiving signals outputted by said QMU, which in one case outputs after tapping and in the other case outputs after the AGC, an SEB for receiving the AGC output of said first ADB which in one case outputs after tapping and in the other case selects a band with a tuner and demodulates the data, a second SEB for receiving the tap output of said first SEB, a third SEB for receiving the tap output of said second SEB, a group consisting of the total of K(1) SEBs connected to the AGC output system of said first ADB, a second ADB for receiving the tap output of said first ADB, a group consisting of the total of K(2) SEBs connected to the AGC output system of said second ADB, a third ADB for receiving the tap output of said second ADB, a group consisting of the total of K(3) SEBs connected to the AGC output system of said third ADB, wherein L (L is an integer) ADBs are connected to the tap system of said first ADB and the total of $K=K(1)+K(2)+K(3)+\ldots+K(L)$ SEBs are connected to the AGC output system of each ADB and the SEB groups starting from the SEB group connected to the AGC output system of said first ADB to the SEB group connected to the AGC output group of said Lth ADB are allocated to the received QAM signals in the order starting from the highest frequency received QAM signal and, thereby, it can be made resistant to the influence of the tilt in the frequency characteristics generated in the cable that connects the ADBs.

The entire disclosure of the above document is incorporated herein by reference in its entirety.

As is clear from the above description, the present invention has the advantage that a signal distribution system, a transmission device, a reception device, a medium and an information assembly that can effectively transmit data can be provided.

What is claimed is:

1. A signal distribution system comprising:
transmission means of respectively allocating different frequencies to a plurality of signals and of transmitting said signals by utilizing the allocated frequencies;
communication paths for transmitting said plurality of signals to be transmitted; and
a plurality of reception means of receiving said transmitted plurality of signals in which the different frequencies are allocated based on predetermined corresponding relationships,
wherein said corresponding relationships are between each of said different frequencies and each of said reception means, said corresponding relationships are predetermined based on substantial distances between said transmission means and each of said reception means along said communication paths.

2. The signal distribution system according to claim 1, wherein
said predetermined corresponding relationships are based on a relationship of a smaller value of the distance, the higher the value of the frequency allocated to the respective reception means and vice versa,
said plurality of reception means respectively have a plurality of terminals, and
said communication paths are coaxial cables.

3. A signal distribution system according to claim 2, wherein contents of said signals are determined based on requests from said terminals and the determined signals are transmitted on said communication paths by using the frequencies corresponding to the reception means with the terminals that have sent said requirements.

4. A signal distribution system according to claim 3, wherein
said plurality of signals are a plurality of quadrature amplitude modulation signals;
said reception means further have a plurality of region distribution boxes, respectively, which are connected according to a distance from said transmission means;
said terminals are seat electronics boxes provided in airplanes and
said transmission means is a quadrature amplitude modulation unit which can frequency multiplex said plurality of quadrature amplitude modulation signals.

5. A signal distribution system according to claim 4, wherein said quadrature amplitude modulation unit selects a quadrature modulation system having a plurality of a number of bits to be encoded for said signal received by one of the region distribution boxes, wherein the smaller the substantial distance between said transmission means and said reception means along said communication path is the higher said number of bits is, and transmission of said signal is carried out by utilizing the selected modulation system.

6. A transmission device for respectively allocating different frequencies to a plurality of signals and for transmitting said plurality of signals to a plurality of reception means of receiving signals, in which the different frequencies are allocated based on predetermined corresponding relationships, via communication paths by utilizing the allocated frequencies,
wherein said corresponding relationships are between each of said different frequencies and each of said reception means, said corresponding relationships are predetermined based on substantial distances between said transmission device and each of said reception means along said communication paths.

7. A reception device for receiving a signal in which a frequency is allocated based on a predetermined corresponding relationship from among a plurality of signals transmitted, via a communication path, from a transmission means for respectively allocating different frequencies to said plurality of signals and for transmitting said signals by utilizing the allocated frequencies,
wherein said corresponding relationship is between said frequency and said reception device, the corresponding relationship is predetermined based on a substantial distance between said transmission means and said reception device along said communication path.

8. A signal distribution system comprising:
a transmission means of selecting modulation systems having a plurality of bits to be encoded for a plurality of signals and of transmitting said plurality of signals using the selected modulation systems;
communication paths for transmitting said plurality of signals to be transmitted; and
a plurality of reception means, each associated with a respective transmitted signal,
wherein the smaller a substantial distance between said transmission means and said plurality of reception means along said communication paths is the higher the number of bits is.

9. A signal distribution system according to claim 8, wherein:
said plurality of signals are a plurality of quadrature amplitude modulation signals;
said reception means further have a plurality of seat electronics boxes provided in airplanes and a plurality of region distribution boxes, respectively, which are connected according to a distance from said transmission means; and
said transmission means is a quadrature amplitude modulation unit which can frequency multiplex said plurality of quadrature amplitude modulation signals and is connected to the plurality of region distribution boxes according to an increasing distance.

10. A signal distribution method comprising the steps of:
allocating respectively different frequencies to a plurality of signals on a transmission side;
transmitting said plurality of signals to be transmitted by utilizing the allocated frequencies via communication paths; and
receiving signals in which the different frequencies are allocated based on predetermined corresponding relationships,
wherein said corresponding relationships are between each of said frequencies and each of said reception sides, said corresponding relationships are predetermined based on substantial distances between said transmission side and each of said reception sides along said communication paths.

11. A transmission method for respectively allocating different frequencies to a plurality of signals on a transmission side and for transmitting said plurality of signals to a plurality of reception sides of receiving signals, in which the different frequencies are allocated based on predetermined corresponding relationships, via communication paths by utilizing the allocated frequencies,
wherein said corresponding relationships are between each of said frequencies and each of said reception sides, said corresponding relationships are predetermined based on substantial distances between said transmission side and each of said reception sides along said communication paths.

12. A reception method for receiving a signal in which a frequency is allocated based on a predetermined corresponding relationship from among a plurality of signals transmitted, via a communication path, from a transmission side for respectively allocating different frequencies to said plurality of signals and for transmitting said signals by utilizing the allocated frequencies,
wherein said corresponding relationship is between said frequency and a reception side, said corresponding relationship is predetermined based on a substantial distance between said transmission side and said reception side along said communication path.

13. A signal distribution method comprising the steps of:
selecting modulation systems having a plurality of bits to be encoded for a plurality of signals on a transmission side;

transmitting said plurality of signals using the selected modulation systems via communication paths; and receiving said transmitted plurality of signals among a plurality of reception sides, each of the plurality of reception sides associated with a respective transmitted signal, wherein the smaller a substantial distance between said transmission side and each of said plurality of reception sides along said communication paths is, the higher the number of bits is.

14. A computer readable medium for holding a program or data that allow a computer to carry out the functions of any one of claims 1–9, wherein the medium is processed by a computer.

15. An information assembly that allow a computer to carry out the functions of any one of claims 1–9, wherein the information assembly is a program or data.

* * * * *